US009331607B1

(12) United States Patent
Yoonessi et al.

(10) Patent No.: US 9,331,607 B1
(45) Date of Patent: May 3, 2016

(54) LARGE STRAIN TRANSPARENT MAGNETO-ACTIVE POLYMER NANOCOMPOSITES

(71) Applicant: The United States of America, as represented by the Administrator of the National Aeronautics and Space Administration, Washington, DC (US)

(72) Inventors: Mitra Yoonessi, Avon, OH (US); Michael A Meador, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 720 days.

(21) Appl. No.: 13/686,000

(22) Filed: Nov. 27, 2012

Related U.S. Application Data

(60) Provisional application No. 61/563,962, filed on Nov. 28, 2011.

(51) Int. Cl.

| | |
|---|---|
| ***C23C 6/00*** | (2006.01) |
| ***H02N 99/00*** | (2006.01) |
| ***H01F 1/42*** | (2006.01) |
| ***H01F 41/00*** | (2006.01) |

(52) U.S. Cl.
CPC *H02N 99/00* (2013.01); *C23C 6/00* (2013.01); *H01F 1/42* (2013.01); *H01F 41/00* (2013.01)

(58) Field of Classification Search
None
See application file for complete search history.

(56) References Cited

U.S. PATENT DOCUMENTS

2005/0191231 A1* 9/2005 Sun ........................ H01F 1/0054
423/632

OTHER PUBLICATIONS

Yoonessi, Mitra, Meador, Michael; "Large Strain Transparent Magneto-active Polymer Nanocomposites"; 19 pages, OAI, Cleveland, OH, NASA GRC, Cleveland, OH.
Yoonessi, Mitra, Peck, John A., Bail, Justin L., Rogers, Richard B., Lerch, Bradley A., Meador, Michael A., "Transparent Large Strain Thermoplastic Polyurethane Magneto-active Nanocomposites", 23 pages, OAI, Cleveland, OH, NASA GRC, Cleveland, OH, University of Akron, Akron, OH.
Meador, Michael M., Yoonessi, Mitra, "LargeStrain Transparent Magnetoactive Polymer Nanocomposites"; Jun. 28, 2011; www.techbriefs.com under the Materials category LEW 18752-1; NASA GRC, Cleveland, OH, OAI, Cleveland, OH.

* cited by examiner

*Primary Examiner* — Steven Bos
(74) *Attorney, Agent, or Firm* — Robert H. Earp, III

(57) ABSTRACT

A large strain polymer nanocomposite actuator is provided that upon subjected to an external stimulus, such as a magnetic field (static or electromagnetic field), an electric field, thermal energy, light, etc., will deform to thereby enable mechanical manipulations of structural components in a remote and wireless manner.

13 Claims, 19 Drawing Sheets

400

500

600A

600B

600C

900A

900B

900C

1100B 6 wt% MNP/TPU nanocomposites (same units as FIG. 11A)

1100A 0.5 wt% MNP/TPU nanocomposites

1200A

1200B

1300

1400C

1500A

1500B

LARGE STRAIN TRANSPARENT MAGNETO-ACTIVE POLYMER NANOCOMPOSITES

CROSS-REFERENCE TO RELATED APPLICATIONS

This application claims the benefit of U.S. Provisional Patent application Ser. No. 61/563,962 entitled "LARGE STRAIN TRANSPARENT MAGNETO-ACTIVE POLYMER NANOCOMPOSITES" filed on Nov. 28, 2011. The entirety of the above-noted application is incorporated by reference herein.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

Actuators and smart materials are materials that exhibit mechanical deformation in response to an external stimulus such as an electric field, thermal energy, light, and electrochemical media. Actuators are of great interest due to their current and potential applications in aerospace structural components. Specifically, these materials, when actuated, perform a number of different functions, such as deploying solar arrays, antennas, flexible packaging, etc. Actuating these materials, however, via electro-resistive heating requires electrodes and wiring to the structural components. In addition, thermal shape memory polymers necessitates applying stress at a temperature above switching temperature to fix the polymer shape after recovery.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, a remote actuation of a magnetic polymer nanocomposite by a magneto-static or electromagnetic field is disclosed, which will enable mechanical manipulations of the structural components in a remote and wireless manner which is of high value in extreme environment.

In another aspect of the innovation, a method of producing a large strain nanocomposite film is provided that includes mixing predetermined amounts of iron (III) acetylactonate, manganese acetyl acetonate, dodecanoic acid, 1, 2 dodecanediol, and 6 mmol of dodecylamine to form a mixture of nanoparticles, mixing the mixture with a predetermined amount of benzyl ether under a nitrogen blanket for a first predetermined amount of time, increasing a reaction temperature to approximately 150° C. for a second predetermined time, increasing the reaction temperature to approximately 300° C. for a second predetermined time, precipitating the mixture in methanol, and centrifuging and washing mixture with excess methanol.

In accordance with yet another aspect of the innovation, the method further includes dispersing the mixture of nanoparticles in tetrahydrofuran (THF), sonicating the mixture of nanoparticles for a fourth predetermined time, dissolving the dispersion in THF, and mixing the dispersions with a surface-modified manganese ferrite suspension $MnFe_2O_4$.

In still yet another aspect of the innovation, a method of actuating a large strain actuator is provided and includes providing a thermoplastic polyurethane (TPU) polymer nanocomposite film having manganese ferrite ($MnFe_2O_4$) nanoparticles, applying an external stimulus to the nanocomposite film, deforming a shape of the nanocomposite film, and actuating an object caused by the deformation of the nanocomposite film.

In still yet another aspect of the innovation, the method further includes removing the external stimulus, recovering the shape of the nanocomposite film, and reproducing the deformation of the nanocomposite film upon application of the external stimulus.

In still yet another aspect of the innovation the innovation, a large strain actuator is provided that includes a nanocomposite film including manganese ferrite ($MnFe_2O_4$) nanoparticles added to a thermoplastic polyurethane (TPU) polymer film, wherein the nanocomposite film experiences a deformation is greater than 10 mm when exposed to an external stimulus, whereby the external stimulus includes one of a magnetic field, an electric field, thermal energy, and light.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
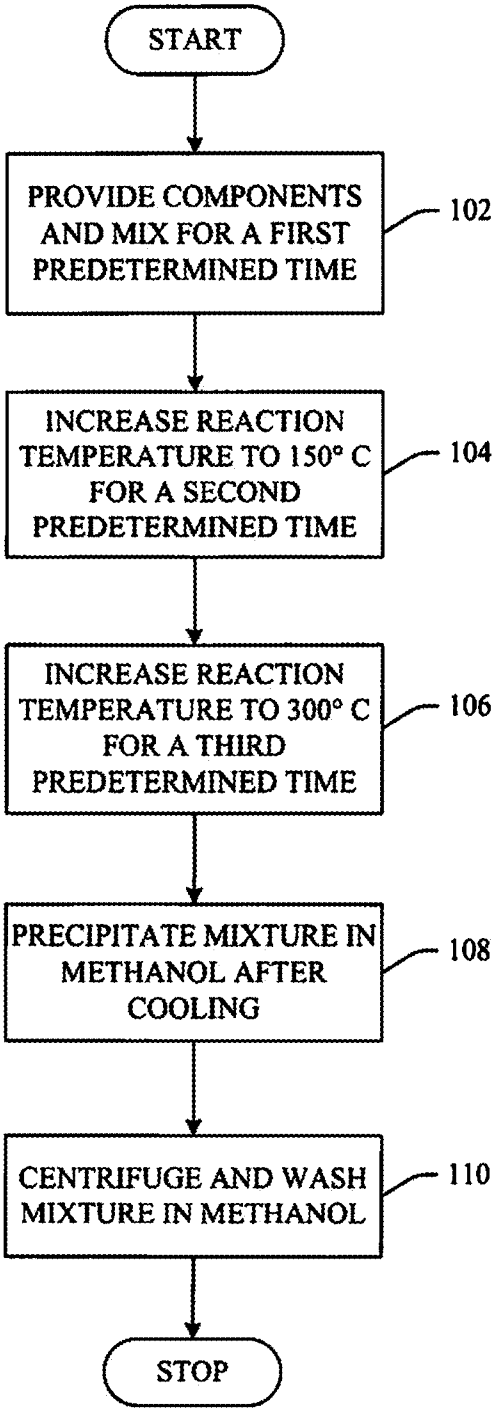
FIG. 1 is an example flow-chart of a procedure of synthesizing hydrocarbon-coated iron manganese oxide nanoparticles in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Polymer nanocomposite actuators are of great interest due to their potential applications in aerospace structural components, micro-robotics, artificial muscles, temperature-sensitive switches and valves, magneto-driven biocompatible devices, "morphing" airframe or aircraft engine structures or self-deployable structures, e.g., large area solar arrays or antennae and habitats, etc. Polymer nanocomposite actuators are materials that undergo mechanical deformation by application of an external stimulus such as a magnetic field, electric field, light, and thermal energy.

The innovation disclosed herein focuses on the remote actuation of a magnetic polymer nanocomposite by a magneto-static or electromagnetic field. Magneto-active materials are materials that exhibit magnetic properties coupled with mechanical deformation in a static or electromagnetic field. This type of actuation results in deformation which is recoverable upon removal of the field and is reproducible. This technology can be used for space deployable structures where a small compact, lightweight volume needs to undergo sudden large shape changes. It can also be extended to the actuation of structural components in aircrafts, e.g., wings or fan blades where a magnetic field can induce deformation of components. Some examples of these technologies are given below.

Actuation and morphing of light weight structural materials have great impact in outperforming current aerospace components to the new generation of aerospace vehicles. Adaptive structures (soft and hard materials) have applications ranging from unmanned aerial vehicles (UAV), micro air vehicles (MAV), deployable antenna, satellite structures, remote light weight unlocking mechanisms, deployable structures on the Moon and Mars, morphing and adaptive wing skin. Mechanical manipulation of the structures in extreme outer space environments by wireless remote method is of great significance to space missions. Unlocking a compact volume to a large structure is essential for transportation of structures to the orbit or outer space. Adaptive materials will enhance air vehicle maneuverability such as bio-inspired moving wings, where airplane wings could change depending on the altitude and mission. Shape change could result in reduced fuel consumption by change of structural components during takeoff, cruising and landing.

The innovation discloses a superparamagnetic polymer nanocomposite actuator films prepared by addition of superparamagnetic nanoparticle into the polymer films of both thermoplastic polyurethane (TPU) and high stiffness polyimide resin. The TPU magnetic nanocomposites are called soft magneto-active materials and polyimide magnetic nanocomposites are called hard magneto-active nanocomposites.

While other approaches to magnetically responsive materials have been developed and demonstrated, the advantage of the innovation is that a much smaller amount of nanoparticles (less than 1%) is required to obtain large displacements (>10 mm) of the polymer film under an applied external stimulus. The magneto-actuation deformation increases with an increasing magnetic nanoparticle content exponentially. As a result, these materials are much lighter in weight than other magnetically responsive materials and have other desirable attributes such as optical transparency.

In addition, nanocomposites prepared with other magnetic nanoparticles, core-shell nanoparticles of a different chemical composition, exhibit resistive heating when placed in an alternating magnetic field. Nanocomposite films prepared from these nanoparticles experienced temperature rises as high as approximately 300° C. under these conditions. Such temperature increases might be sufficient to initiate self-healing in nanocomposites films and fiber reinforced nanocomposites.

The TPU magneto-active polymer nanocomposites disclosed herein are both transparent and magnetically active with low loading levels (<2 wt %) of superparamagnetic nanoparticles. In addition, the TPU magneto-active polymer nanocomposites disclosed herein have been prepared by solvent casting as a thermoplastic elastomer. They can, however, be melt processed by injection molding, extrusion, which is significantly important for high throughput industrial processes.

Magnetic actuation can be induced by applying a magnetic field (static or electromagnetic) to a magnet-active polymer composite. Magneto-active polymer composites are hybrid materials composed of a polymer and magnetic material which exhibit overall magnetic properties. Magnetic nanoparticle polymer nanocomposites have great potential for large strain actuators due to their large particle number density, the large interfacial area between the magnetic nanoparticles and the polymer matrix. Low loading levels of magnetic nanoparticles is important for aerospace applications since reduced weight is a critical driver for materials. Magnetic nanoparticles can be incorporated into soft polymer matrices to generate polymer nanocomposite actuators. This method can be extended to structural components with higher glass transition temperatures to allow deformation above the glassy state.

Some known actuators include, lightweight aerogel magnetic actuators prepared by freeze-dried cellulose nanofibril aerogels as templates for non-agglomerated growth of cobalt-ferrite, have shown actuation responses even in low magnetic fields. Coiling mechanisms and large deformation of spherical micron-sized iron particle polysiloxane have been disclosed for composites with particle loads of 20 to 77 wt %. Disclosed magnetic actuation of iron oxide ($\gamma$-$Fe_2O_3$) nanorods in poly (lactide-co-glycolide) biocompatible nanocomposites (10-30 wt %) could potentially stimulate cells to promote nutrient supply.

Further, epoxy/micron-sized strontium ferrite powder composite (95.3 wt %) micro-actuators exhibited small deflections when tested both statically and dynamically. Electromagnetic actuation of nickel (Ni) nanowire cellulose nanocomposites (approximately 34 wt %) with both DC and AC currents generating constant and alternating magnetic field have also been disclosed. Magnetic-sensitive gels of chemically-crosslinked polymer networks with approximately 10 nm mono-domain magnetic nanoparticles undergo shape distortion when a magnetic field is applied.

Still further, the free energy of the swollen network containing both elastic and magnetic components has been studied as the basis for the shape change.

Nanocomposites of (3.5-6.5 nm) maghemite polystyrene exhibited structural supra-aggregate organization with a size of approximately 200 nm at volume fractions, $\phi \geq 5\times10^4$. Primary aggregates were formed at lower volume fractions ($<5\times10^4$) as shown by small angle x-ray scattering and transmission electron microscopy (TEM). The mechanical response of 1-10 wt % micron-sized $Fe_3O_4$/polyvinyl alcohol magnetic hydrogels in low magnetic field (40mT) has also been disclosed.

Magnetic nanoparticles can be synthesized to generate different chemical compositions, shapes, sizes, and aspect ratios. These characteristics determine the magnetic strength of the nanoparticles. Magnetic nanoparticles below a critical diameter are super-paramagnetic, where the spin rotation is random, and the material can be magnetized and demagnetized upon application or removal of the magnetic field with no relaxation time. These superparamagnetic nanoparticles have single domains and respond quickly to a magnetic field above the blocking temperature. They also tend to agglomerate due to magnetic and van der Waals forces, which lower the nanoparticles surface area. The high coercivity of superparamagnetic particles is attributed to single domain effects. The increase in the aspect ratio also results in a significant increase in coercivity, i.e. the coercivity of Fe nanoparticles increased from 82 mT to 1 T when the aspect ratio was increased from 1.1 to 10. Magnetic nanoparticles have been synthesized by co-precipitation, thermal decomposition, microemulsion, and hydrothermal synthesis. Monodisperse metallic nanoparticles can be synthesized by a thermal decomposition method. This method involves reduction of organo-metallic compounds in high boiling point solvents containing surfactants as a stabilizing agent and polyol as the reducing agent.

As will be subsequently described, the innovation discloses the preparation and characterization of surface-modified manganese ferrite ($MnFe_2O_4$) thermoplastic polyurethane elastomer nanocomposites (0.1 wt %-8 wt %), which are capable of large deformations under applied magnetic fields. Due to the small particle size of the super-paramagnetic nanoparticles, the low particle loading (0.1 and 0.5 wt %) nanocomposites were transparent and exhibited large deformations in a static magnetic field.

Referring now to the drawings and specifically to FIG. 1, a method of synthesizing hydrocarbon-coated iron manganese oxide nanoparticles will be described. Specifically, at 102, 2 mmol of iron (III) acetylactonate, 1 mmol of manganese acetyl acetonate, 6 mmol dodecanoic acid, 10 mmol of 1, 2 dodecanediol, and 6 mmol of dodecylamine were mixed with 20-30 cc of benzyl ether under a nitrogen blanket for approximately 15 min. Then, at 104, the reaction temperature was then increased to approximately 150° C. for 30 minutes. At 106, the reaction temperature is increased to approximately 300° C. for approximately 30 minutes. At 108, the iron manganese oxide nanoparticles were precipitated in methanol after cooling and at 110, the nanoparticles are centrifuged and washed several times with excess methanol.

Figure 2:
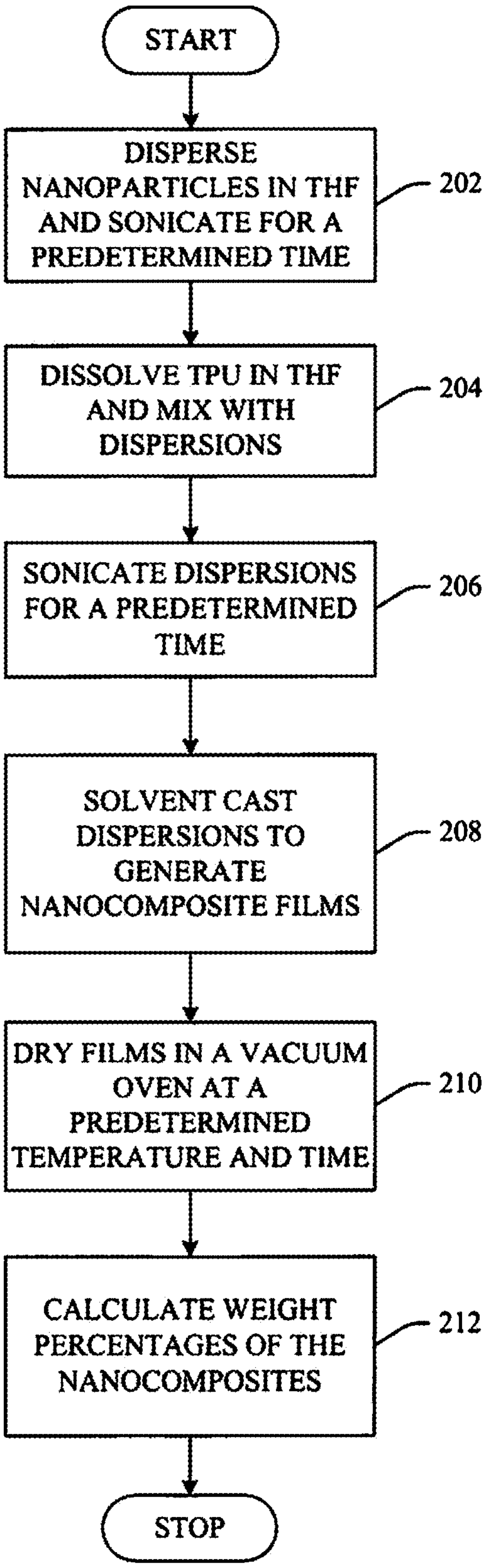
FIG. 2 is an example flow-chart of a procedure of preparing nanocomposite films from the synthesized nanoparticles in accordance with an aspect of the innovation.
Figure 3:
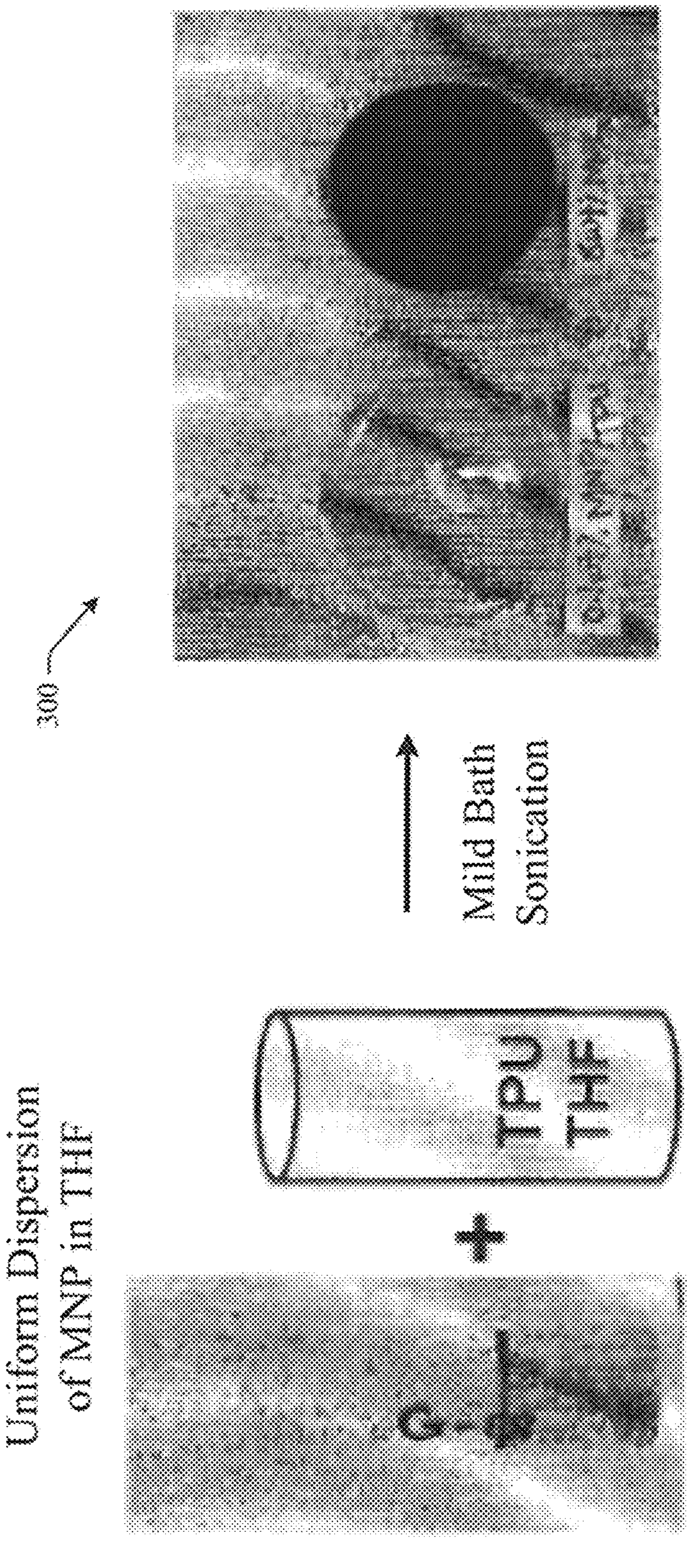
FIG. 3 is an illustration of the polymer nanocomposite films in accordance with an aspect of the innovation.

Referring to FIGS. 2 and 3, a method of preparing the nanocomposite film from the synthesized nanoparticles above is described. At 202, magnetic nanoparticles are dispersed in tetrahydrofuran (THF) and sonicated for approximately 5 minutes to generate visibly aggregate free dispersions. At 204, the TPU is dissolved in THF and mixed with surface-modified $MnFe_2O_4$/THF suspensions. At 206, the TPU/surface-modified $MnFe_2O_4$/THF dispersions are sonicated for 30 minutes. At 208, the dispersions are solvent cast to generate nanocomposite films 300 (0.1-8 wt %) approximately 75-100 micron thick. At 210, the films are dried in a vacuum oven at a predetermined temperature and time to remove excess solvent. At 212, weight percentages of the nanocomposites are calculated based on $MnFe_2O_4$ content.

A thermogravimetric analyzer, using a controlled atmosphere of nitrogen, a temperature range of 25-800° C., and a scan rate of 10° C./minute, determines a change in weight in relation to a change in temperature of the nanocomposite film. A Fourier transform infrared spectrometer was used to obtain an infrared spectrum of the nanocomposite film. In addition, a high resolution transmission electron microscopy (TEM) image of the nanocomposite film was obtained. Cryo-fractured surfaces of the nanocomposite film were exposed to air plasma for 3 minutes and another image of the nanocomposite film was obtained using a scanning electron microscope (SEM). A wide angle x-ray scattering was performed on a diffractometer configured in the Bragg-Brentano geometry with Cu K-α (λ=1.5418 Å) radiation source and a linear position sensitive detector.

Magneto-mechanical testing was performed on a micro-load-pneumatic test rig. Tests were performed in stroke control at a rate of 0.5 mm/s. Full-field optical displacement imaging was used with a frame capture rate of 0.125 seconds. A film sample was placed vertically at a starting distance of approximately 50 mm from the magnet. A static magnet with a strength of 0.43 T ($B_y$ (y=0)) was used. All three components of the magnetic field were measured by a triple-axis magnetometer. Only $B_y$ is acting on the film surface perpendicular to the x-z plane ($B_x$ and $B_z$, were negligible and verified by the measurements). The z-variation of $B_y$ was negligible along the film z-axis within the experimental geometry constraints. The sample was moved toward the magnet using the test rig stroke, which resulted in the increasing magnetic field. The magnetic field, $B_y$, variations with the position along the y-direction was measured in 0.5 mm increments and fit to a $6^{th}$ order polynomial. Deflection of the film, $\delta_y$, was monitored using the optical displacement system.

Figure 4:
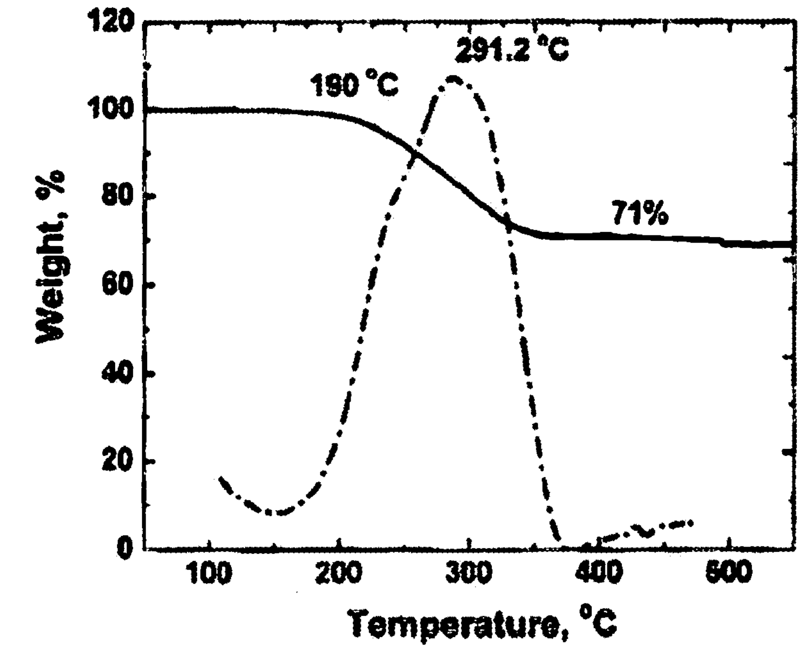
FIG. 4 is a thermo-gravimetric analysis (TGA) of surface-modified $MnFe_2O_4$ nanoparticles in accordance with an aspect of the innovation.
Figure 5:
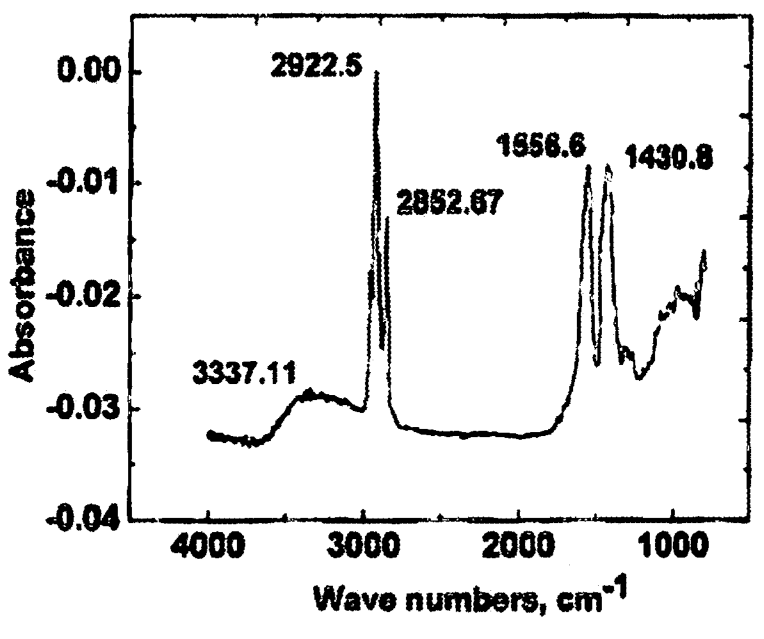
FIG. 5 is graphical representation of an FT-IR spectrum of the organic surface modifier in accordance with an aspect of the innovation.

Surface modification of iron manganese oxide nanoparticles is essential to provide compatibility between the nanoparticles and the thermoplastic polyurethane elastomer matrix. The synthesis method resulted in iron manganese oxide nanoparticles with an organic modifier corona on the surface. Referring to FIG. 4, a thermo-gravimetric analysis (TGA) 400 of the surface-modified $MnFe_2O_4$ nanoparticles shows approximately 29 wt % hydrocarbon on the surface of the $MnFe_2O_4$ nanoparticles with a degradation temperature onset of 190° C. and a maximum degradation temperature of 291.3° C. Referring to FIG. 5, an FT-IR spectrum 500 of the organic surface modifier is illustrated and exhibits a band at 3337 $cm^{-1}$ corresponding to —OH stretch possibly due to 1, 2 dodecanediol, or the presence of a hydroxyl group on the $MnFe_2O_4$ surface. The —CH stretch of saturated aliphatic hydrocarbons generally appears in the range of 3000 to 2800 $cm^{-1}$, whereas the bending appears at 1500 and 1300 $cm^{-1}$. The stretches observed at 2922.5 and 2852.6 $cm^{-1}$ are due to the —CH stretch in C—$CH_3$, and to the —$CH_2$ presence in the aliphatic hydrocarbon chain of the organic modifiers. The absorption peaks observed at 1430.8 and 1556.6 $cm^{-1}$ are characteristic of the —CH bending stretches.

Figure 6A:
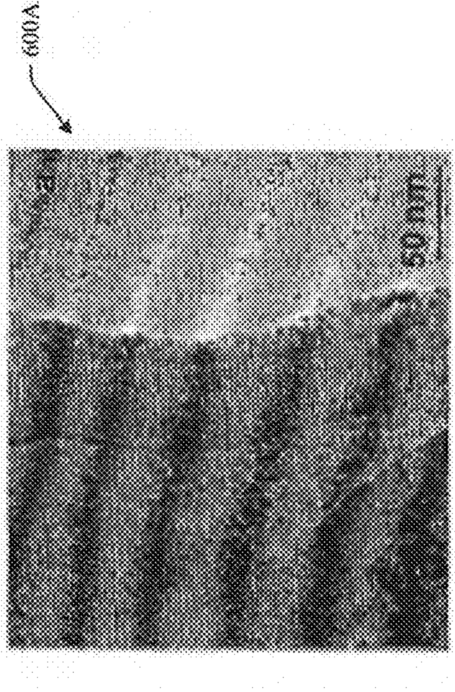
FIG. 6A is an illustration of a transmission electron microscopy (TEM) of organically-modified iron manganese oxide ($MnFe_2O_4$) nanoparticles in accordance with an aspect of the innovation.
Figure 6B:
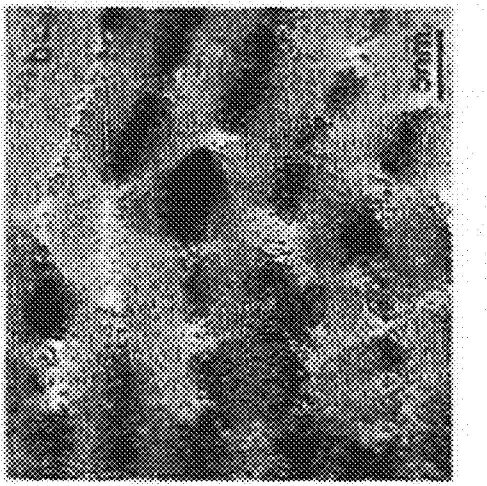
FIG. 6B is an illustration of a high-resolution image of the organically-modified $MnFe_2O_4$ nanoparticles in accordance with an aspect of the innovation.
Figure 6C:
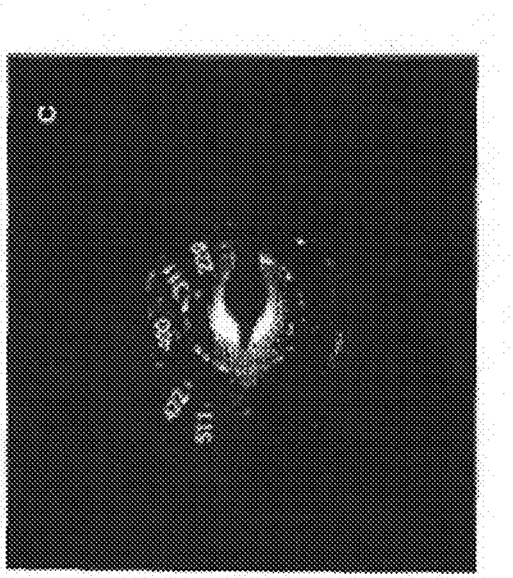
FIG. 6C is an illustration showing a diffraction pattern of the organically-modified $MnFe_2O_4$ nanoparticles in accordance with an aspect of the innovation.

Referring to FIG. 6A, a TEM micrograph 600A of the organically-modified $MnFe_2O_4$ nanoparticles is illustrated. The observed separation between the nanoparticles is attributed to the organic surface modifier of the $MnFe_2O_4$ nanoparticles. High-resolution imaging 600B illustrates the presence of nearly uniform spherical nanoparticles with an average diameter of 6.11±0.69 nm, see FIG. 6B, measured among 250 nanoparticles. FIG. 6C is an illustration showing the electron diffraction pattern 600C of the organically-modified $MnFe_2O_4$ nanoparticles where the diffraction pattern corresponding to hkl indices of 220, 311, 400, 422, 511 are identified.

Figure 7:
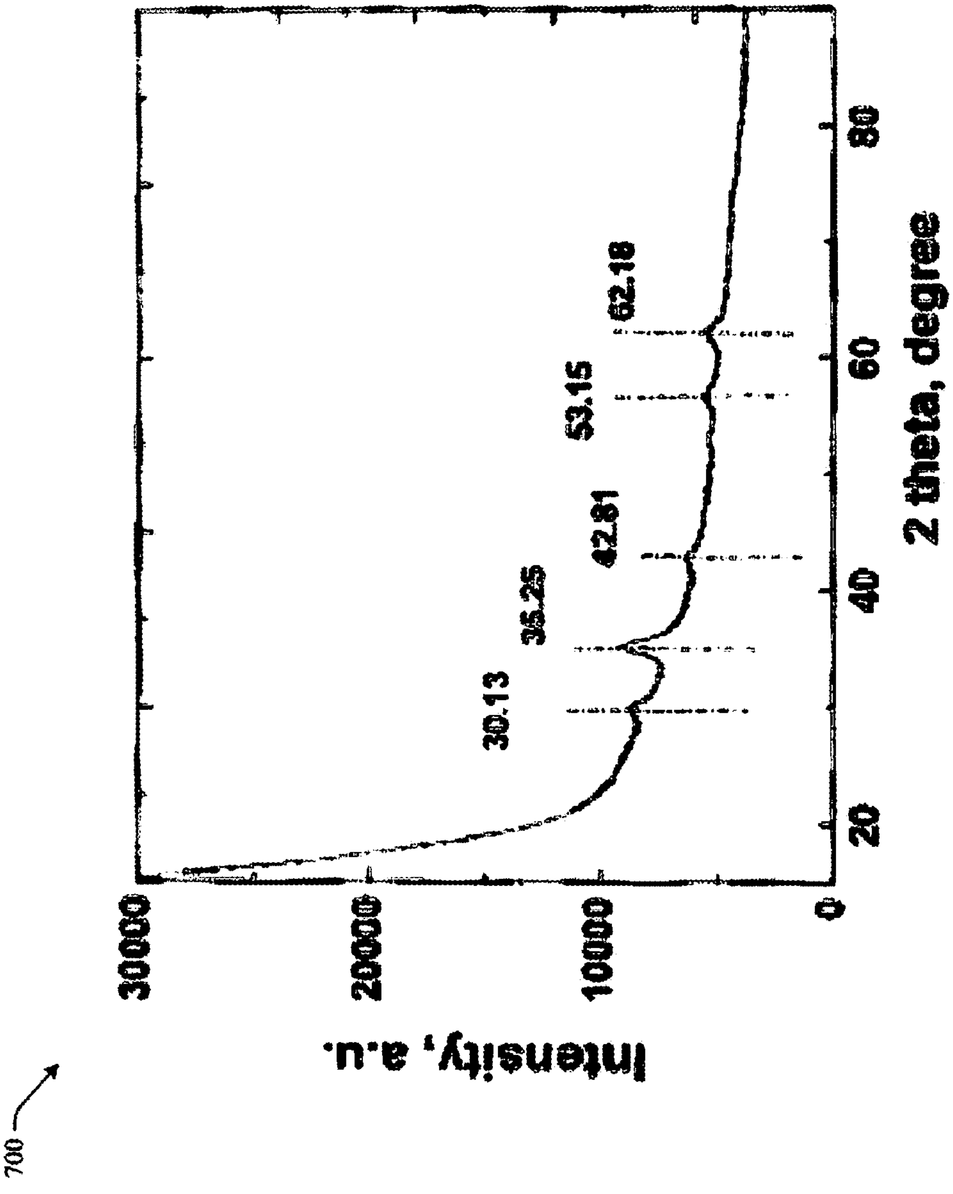
FIG. 7 is a graphical representation of a wide angle x-ray scattering (WAXS) spectrum illustrating lattice spacing and crystalline structure of the organically-modified $MnFe_2O_4$ in accordance with an aspect of the innovation.

Lattice spacing and the crystalline structure of the organically-modified iron manganese oxide nanoparticles were studied using wide angle x-ray scattering (WAXS), see FIG. 7. The diffraction peaks from the WAXS spectrum 700 shows an excellent match to the relative hkl indices of $MnFe_2O_4$ in the PDF database. Table 1, below, lists calculated spacing d(A), based on the relative diffraction peaks of the bulk WAXS spectra of synthesized $MnFe_2O_4$ nanoparticles and their matched hid indices.

TABLE 1

| | WAXS Diffraction Peaks | | | | | | |
|---|---|---|---|---|---|---|---|
| | 1 | 2 | 3 | 4 | 5 | 6 | 7 |
| d | 2.96 | 2.54 | 2.11 | 1.72 | 1.62 | 1.49 | 1.27 |
| $MnFe_2O_4$ | 2.97 | 2.54 | 2.10 | 1.72 | 1.62 | 1.49 | 1.27 |
| hkl | 220 | 311 | 400 | 422 | 511 | 440 | 622 |

Figure 8:
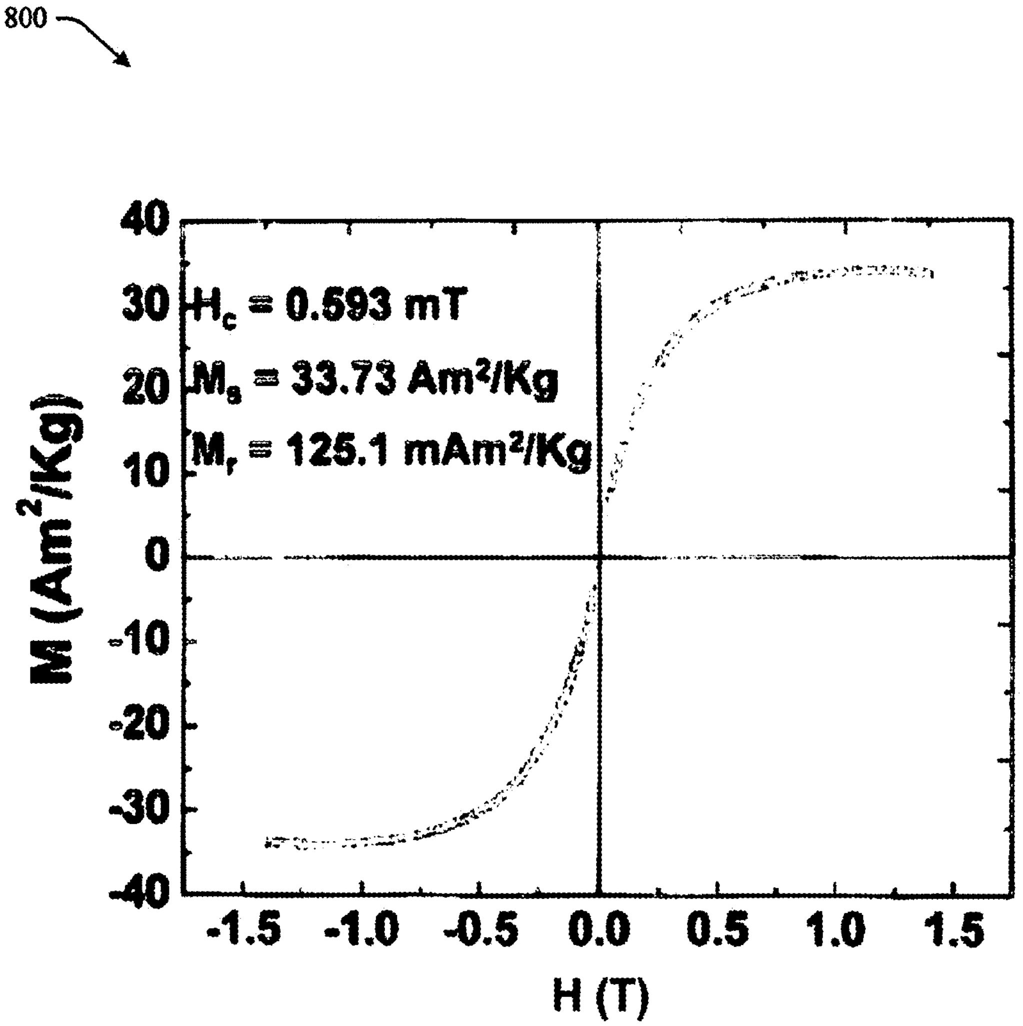
FIG. 8 is a graphical representation illustrating magnetic properties of the surface-modified $MnFe_2O_4$ nanoparticles in accordance with an aspect of the innovation.

A material's magnetic characteristic depends on its chemical composition, size, and aspect ratio. $MnFe_2O_4$ has a Curie temperature, T, of 300° C. and is super-paramagnetic at diameters at least up to 9.9 nm. FIG. 8 is an illustration of a graph 800 illustrating the magnetic properties of the surface-modified $MnFe_2O_4$ nanoparticles, which were measured using an alternating-field gradient magnetometer and, owing to their small size, exhibited closed-loop, super-paramagnetic behavior. The magnetization of a permanent magnet after removal of the external magnetic field is referred to as remanence. The saturation magnetization, M, is the magnetic moment of elementary atoms per unit weight where all of the dipoles are aligned parallel. The reverse magnetic field required to reduce a materials magnetization to zero while the sample is in the magnetic field is called coercivity, H. The surface-modified $MnFe_2O_4$ nanoparticles have a saturation magnetization, M, of 33.73 $Am^2$/kg, a remanent magnetization of 125.1 $mAm^2$/kg, a coercivity, $H_c$ of 0.593 mT and a coercivity of remanence, $H_{cr}$ of 4.6 mT.

TPU elastomers have been widely used as stimuli-responsive polymers due to their segregated two-phase structure. TPU is comprised of hard and soft segments, a chain extender, has a tunable glass transition temperature, and mechanical properties. Soft segments could crystallize and act as physical crosslinks enabling shape recovery effects. TPU used in this study was synthesized by polycondensation reaction of 4-4 methylenediphenylene isocyanate (MDI) and polyol using butanediol as chain extender. Its microstructure is reported to consist of 9.9% hard segments, 58.2% butanediol chain extenders, and 31.8% adipate soft segments. It has shown thermal shape memory effects when used as a host matrix for zinc nanorods and multiwall nanotubes.

Figure 9A:
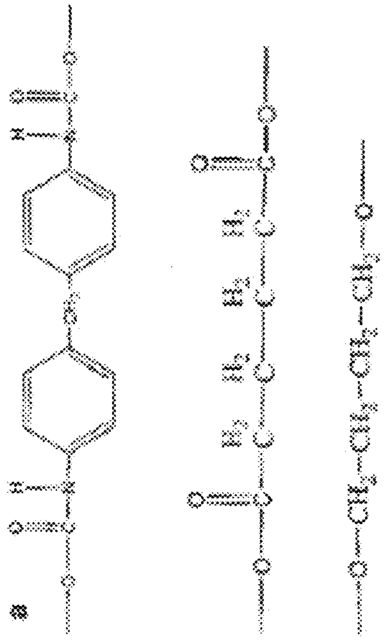
FIG. 9A illustrates a chemical structure and composition of thermoplastic polyurethane (TPU) in accordance with an aspect of the innovation.
Figure 9B:
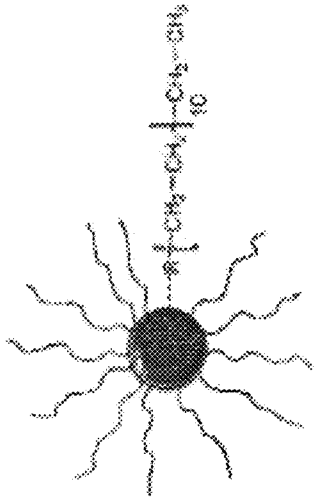
FIG. 9B is a schematic of the organically-modified $MnFe_2O_4$ nanoparticles in accordance with an aspect of the innovation.

The surface-modified $MnFe_2O_4$ nanoparticles were dispersed in TPU containing soft segments of aliphatic alkyl chain to generate nanocomposites films. The chemical structure and composition 900A of the TPU, and a schematic 900B of the organically-modified $MnFe_2O_4$ nanoparticles are shown in FIGS. 9A and 9B respectively. A stable dispersion of organically-modified $MnFe_2O_4$ nanoparticles in THF 900

Figure 9C:
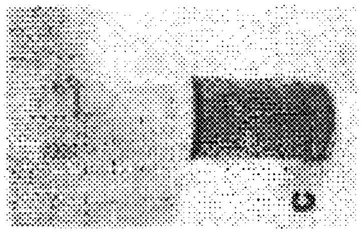
FIG. 9C is an illustration of the organically-modified $MnFe_2O_4$ nanoparticles dispersed in tetrahydrofuran (THF) in accordance with an aspect of the innovation.

C was obtained, see FIG. 9C, which was then mixed with a solution of TPU in THF to generate the nanocomposites films.

The presence of long-chain aliphatic hydrocarbons promotes the compatibility between the inorganic $MnFe_2O_4$ nanoparticle and the polyurethane due to the presence of aliphatic hydrocarbon moieties in the polyurethane polymer chains. This will improve the dispersion of the $MnFe_2O_4$ nanoparticles within the TPU polymer matrix. The surface-modified $MnFe_2O_4$/TPU nanocomposite films were prepared with particle loadings of 0.1, 0.5, 1, 2, 4, 6 and 8 wt % (0.025, 0.126, 0.252, 0.51, 1.03, 1.57, 2.13 vol. %), based upon the weight/volume of the metallic core ($\rho_{MnFe2O4}$=4.76 g/cc and $\rho_{TPU}$=1.19 g/cc). The low weight/volume particle loadings of the nanocomposites were critical to achieving overall lightweight nanocomposites.

Figure 10:
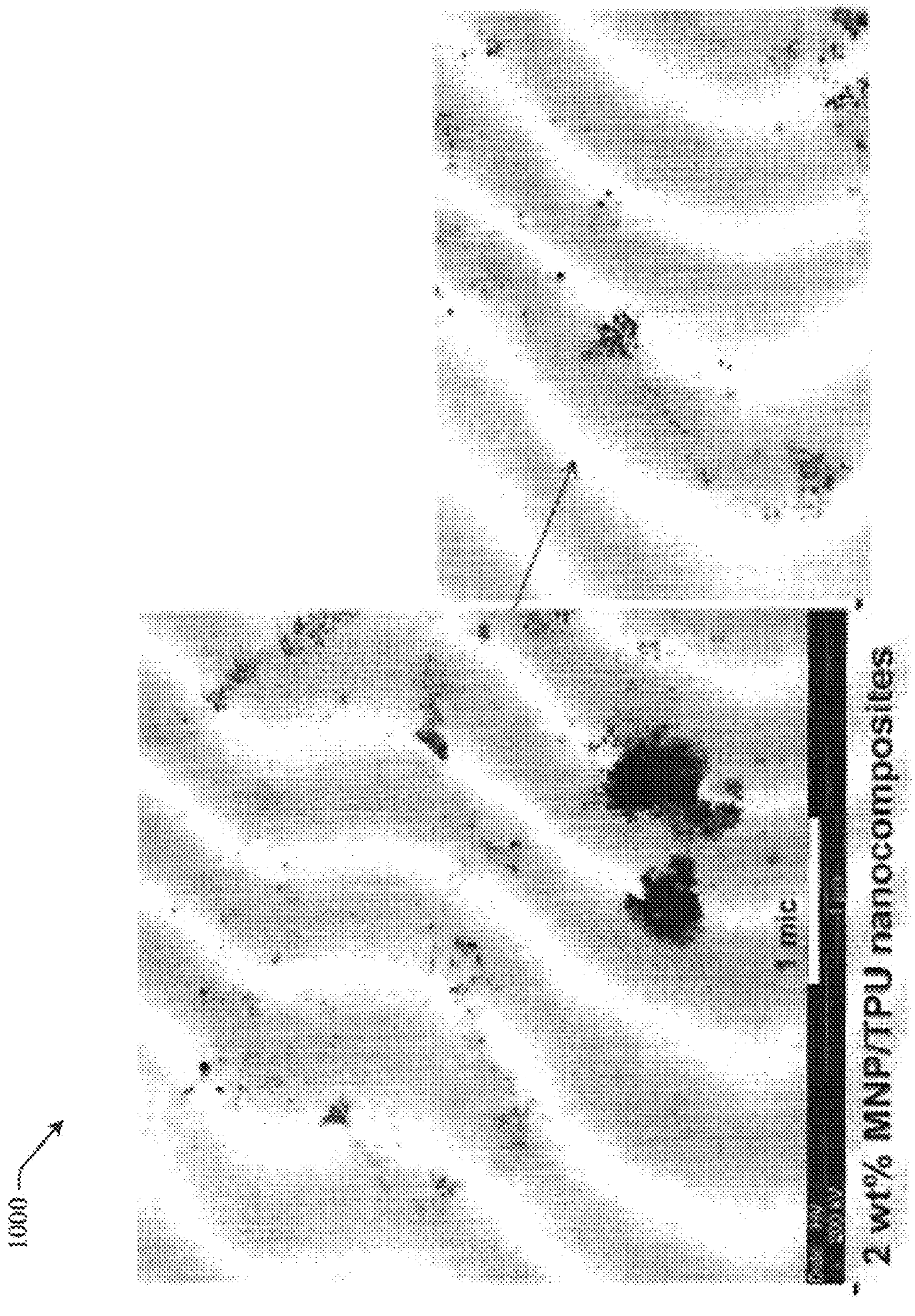
FIG. 10 is a TEM scan of the $MnFe_2O_4$ nanoparticles in the TPU nanocomposite film in accordance with an aspect of the innovation.

Referring to FIG. 10, a TEM scan 1000 examined the dispersion of 2 wt % surface-modified $MnFe_2O_4$ nanoparticles in the TPU nanocomposite film after cryo-microtoming of the film. A variety of nanoparticle clusters, ranging from a few nanoparticles, to larger nanoscale clusters, and micron-sized aggregates were observed. Magnetic and van der Waals attractive forces result in aggregations of the nanoparticles within the film. Dispersion of 4 nm maghemite ($\gamma$-$Fe_2O_3$) nanoparticles in polystyrene occurred only at loading levels below 0.01 vol. % whereas, 200 nm supra-aggregates occurred at loading levels above 0.05 vol. %.

Figure 11B:
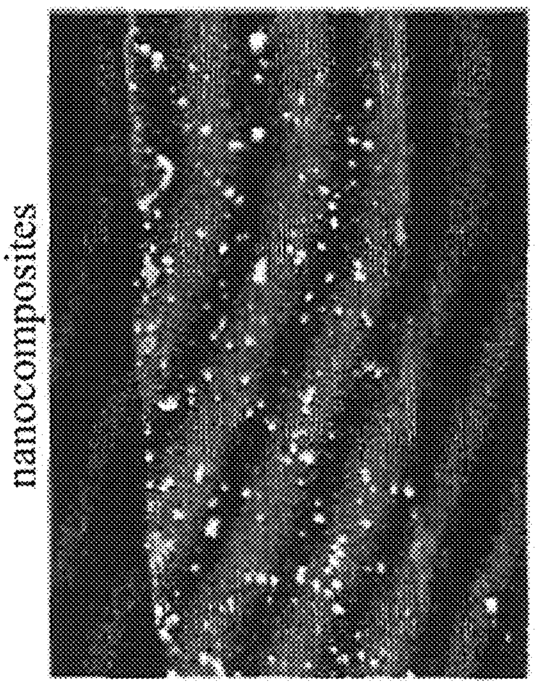
FIGS. 11A and 11B are illustrations of scanning electron microscope (SEM) back-scatter micrographs of 0.5 and 6 wt % surface-modified $MnFe_2O_4$/TPU nanocomposite films respectively after treatment with oxygen plasma in accordance with an aspect of the innovation.
Figure 11A:
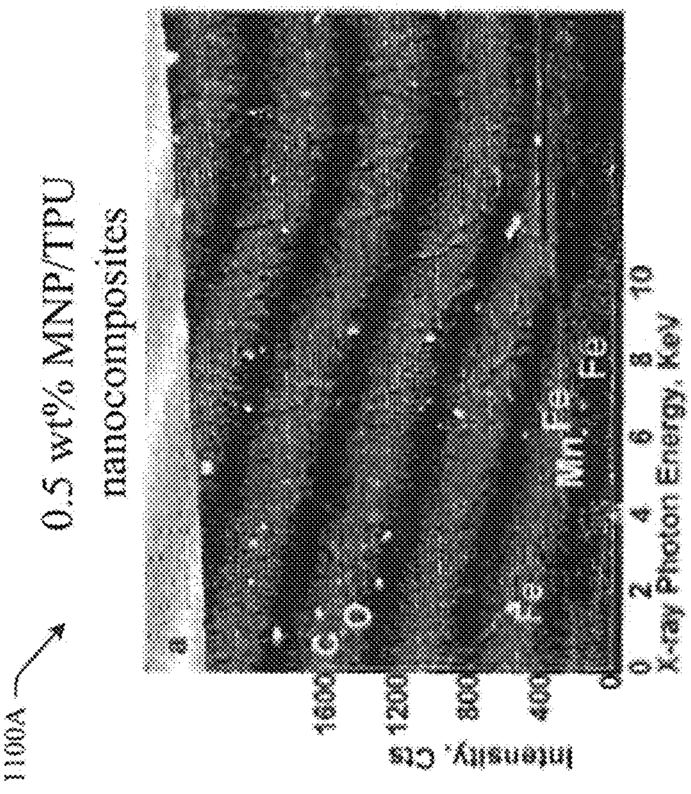

FIGS. 11A and 11B illustrate the SEM back-scatter micrographs 1100A, 1100B of the 0.5 and 6 wt % surface-modified $MnFe_2O_4$/TPU nanocomposite films respectively after treatment with an oxygen plasma. The more dense $MnFe_2O_4$ nanoparticle aggregates appear as bright areas on the SEM micrographs. The aggregate size ranges between 1-3 microns (average of 1. 7 microns) for 0.5 wt % and 1.1-2.9 microns (average of 2 microns) for 6 wt % $MnFe_2O_4$-loaded films. The nanometer-size magnetic nanoparticles and clusters are not resolved at this SEM magnification. The film containing 6 wt % surface-modified $MnFe_2O_4$ nanoparticles exhibited increased nanoparticle density on one side indicating settling of the heavier $MnFe_2O_4$ nanoparticles during solvent evaporation, see FIG. 11B. This settling effect was not observed for 0.5, 1, 2, or 4 wt % surface modified $MnFe_2O_4$. However, settling was more significant for 8 wt % surface-modified $MnFe_2O_4$/TPU nanocomposite film.

Figure 12A:
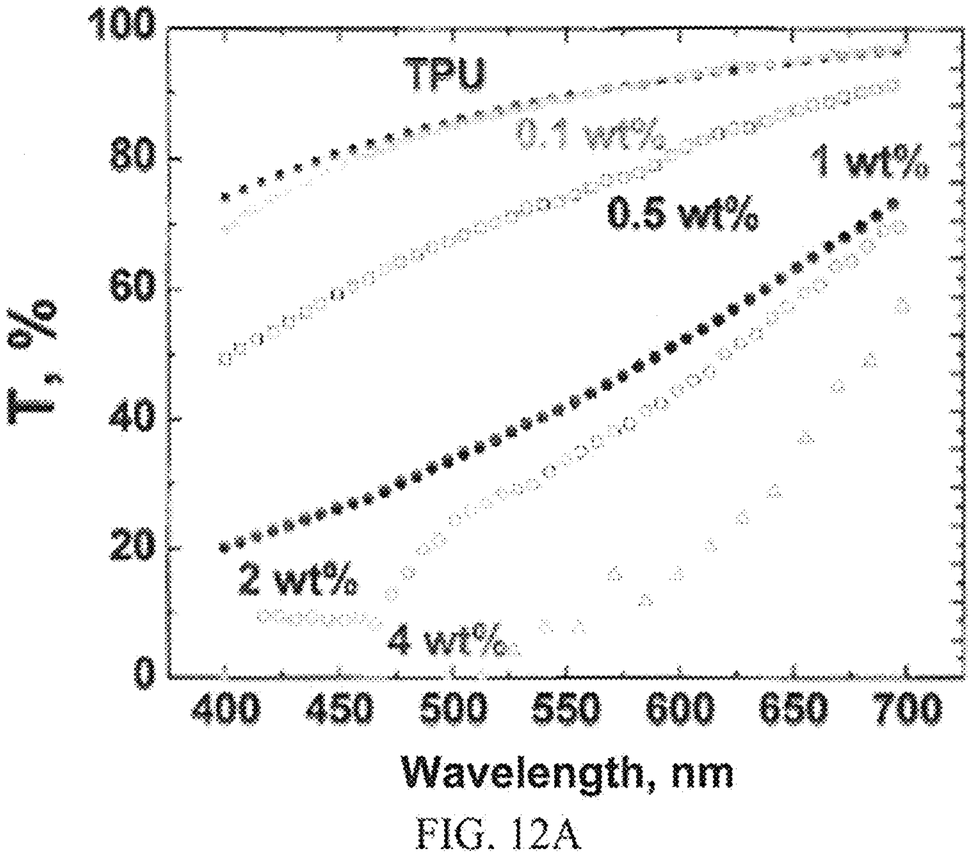
FIG. 12A is a graphical representation illustrating a transparency of the surface-modified $MnFe_2O_4$/TPU nanocomposite films measured over a given wavelength in accordance with an aspect of the innovation.
Figure 12B:
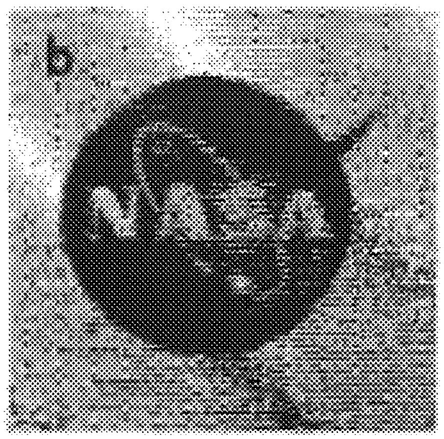
FIG. 12B is an illustration showing a transparency of the 0.1 wt % surface modified $MnFe_2O_4$/TPU nanocomposite film in accordance with an aspect of the innovation.

A graph 1200A illustrating a transparency of the surface-modified $MnFe_2O_4$/TPU nanocomposite films measured over a wavelength range of 400-700 nm is shown in FIG. 12A. The neat TPU film showed a transmission of 97-90% in the range of 700-550 nm, while dropping from 90% to 74.4%, between the 550-400 nm range. The transmission of the 0.1 wt % nanocomposite films was comparable with the neat TPU film where a slight decrease in transmission was observed from 400-460 nm. The decrease in transmission of the 0.5 wt % surface modified $MnFe_2O_4$/TPU nanocomposite in the 700-550 nm range was 91 to 75%, and 75% to 49.5% for the wavelength range of 550-400 nm. Further increase in the loadings of the surface modified $MnFe_2O_4$ to 1 wt % resulted in a decrease in transmission from 73 to 42% for the wave length range of 700-550 nm, and a further decrease of 42-20% for the wavelength range of 550-400 nm. The TPU nanocomposite containing 2 wt % surface-modified $MnFe_2O_4$ didn't show a significant transmission decrease in the range of 700-550 nm range and had a transmission of 69.35 to 33%. However, the transmission in the range of 550-492 nm significantly dropped from 33% to 20% and below 10% for the wavelengths below 470 nm. The 4 wt % surface-modified $MnFe_2O_4$/TPU exhibited a transmission of 53.6 to 16.7% in the range of 700-61 0 mm with a sharp drop to below 10% of wavelengths shorter than 590 nm. The TPU/surface-modified $MnFe_2O_4$ nanocomposite with particle loadings of 0.1 and 0.5 wt % were transparent, 1 and 2 wt % were semi-transparent, and 4 wt % was opaque. FIG. 12B illustrates the transparency of the 0.1 wt % surface modified $MnFe_2O_4$/TPU nanocomposite film 1200B, which is displayed in front of a NASA logo.

Figure 13:
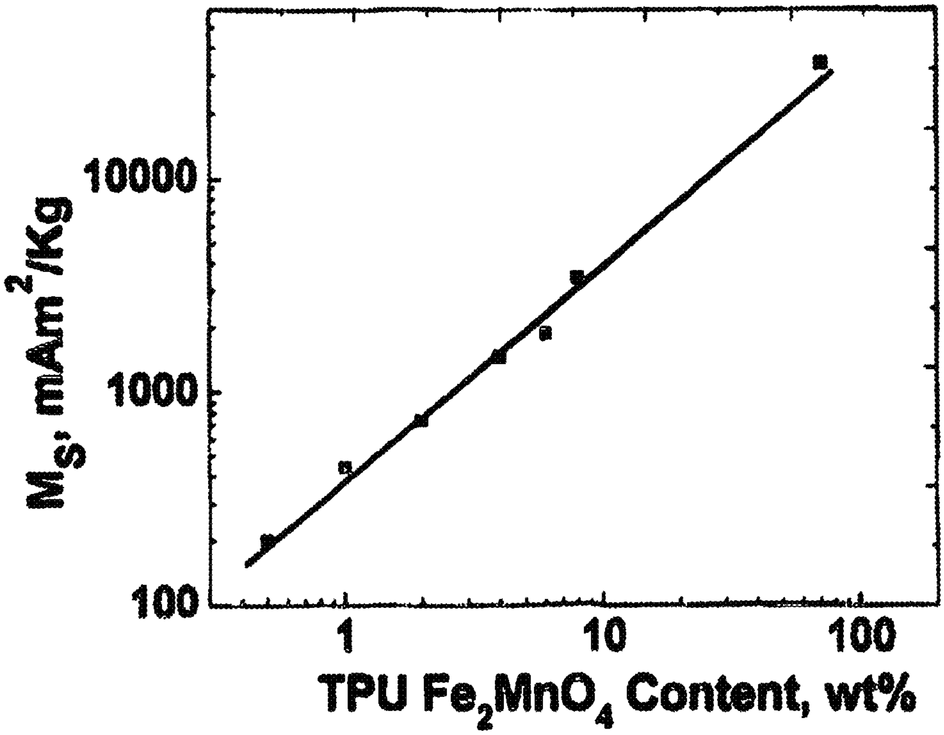
FIG. 13 is a graph illustrating a saturation magnetization, $M_s$, of the nanocomposite films versus concentration of the $MnFe_2O_4$ nanoparticles in accordance with an aspect of the innovation.

Magnetization of the surface-modified $MnFe_2O_4$/TPU nanocomposites was measured to provide information about saturation magnetization, and coercivity. The coercivity of all surface-modified $MnFe_2O_4$/TPU nanocomposite films was in the range of 0.8±0.1 mT. FIG. 13 is a graph 1300 illustrating the saturation magnetization, $M_s$, of the nanocomposite films versus concentration of the $MnFe_2O_4$ nanoparticles. The normalization of the magnetic moment versus magnetic field was performed based on the total weight of the nanocomposite film (TPU+surface modified $MnFe_2O_4$). The plot of saturation magnetization of the nanocomposite films versus magnetic nanoparticle concentration shows an exponential trend as follows:

$$M_s=A\omega^B \quad (1)$$

where A is 380.2±0.033 and B is 1.02±0.038 with $r^2$=0.99.

It should be noted that, the magnetic moment versus magnetic field was also normalized with respect to the weight of the magnetic nanoparticles contained in each nanocomposite film. This normalization yielded constant values for coercivity, $H_c$, 0.8±0.1 mT and magnetization saturation, $M_s$, 0.04±0.01 $mAm^2$/kg.

As illustrated in Equations (2)-(6), the nanocomposite films have magnetic characteristics that result from the embedded super-paramagnetic $MnFe_2O_4$ nanoparticles. These films were placed in a static magnetic field, $\vec{H}$, where a magnetic force, $\vec{F}$, is applied that is proportional to the magnetic potential, $\vec{U}$. The magnetic moment, $\vec{M}$, is related to the magnetic field, $\vec{H}$, with a susceptibility, $\chi$. The force acting on the volume of a magnetic material depends on the magnetic field moment and the rate of the magnetic field change in that direction.

$$\frac{d\vec{M}}{d\vec{H}} = \chi \quad (2)$$

$$\vec{U} = \int_0^{H_0} \vec{M} d\vec{H} \quad (3)$$

$$\vec{U}=(1/2)\chi H_O \quad (4)$$

$$\vec{F} = -\nabla\vec{U} \quad (5)$$

$$F_y = M_y \int_0^V \frac{dHy}{dy} dV \quad (6)$$

Further, referring to Equations (7) and (8), the displacement of the magnetic film (8) is determined using the static deflection of a cantilever beam, where I is the moment of inertia, L, H, and b are length, width and thickness, respectively.

$$\delta = F_y L^3/3EI \quad (7)$$

$$I = bH^3/12 \quad (8)$$

Figure 14A:
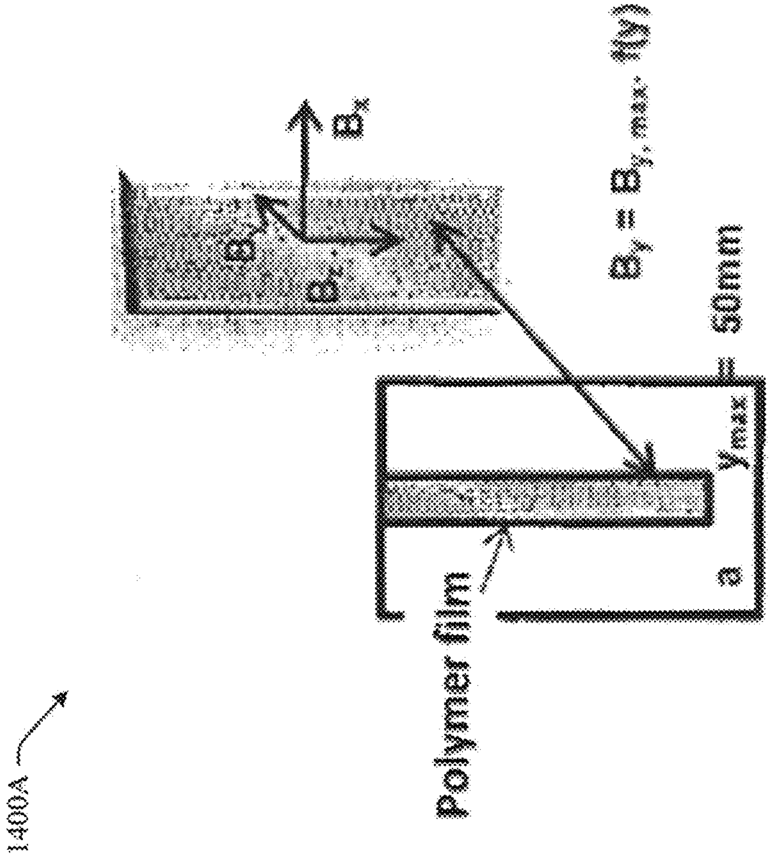
FIGS. 14A and 14B are illustrations of a schematic of a film position with respect to the magneto-static field in accordance with an aspect of the innovation.
Figure 14B:
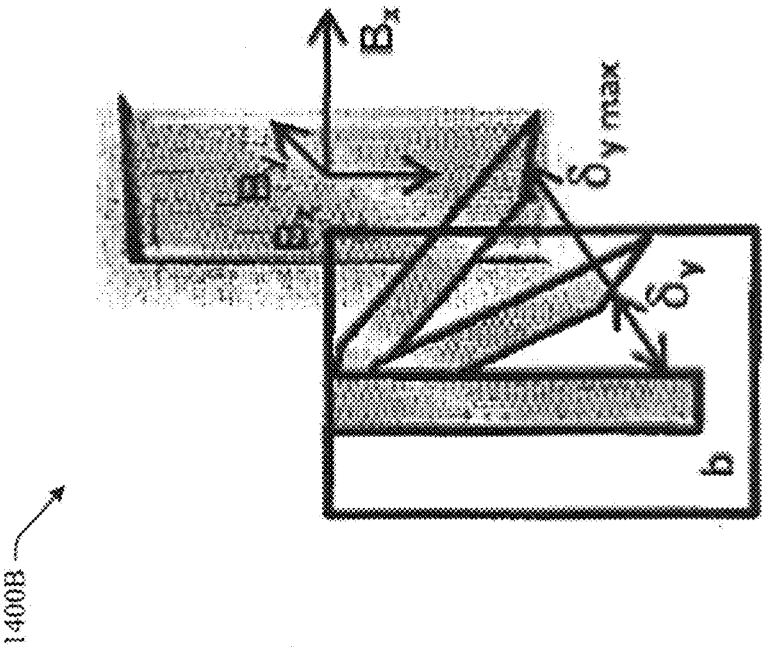
Figure 14C:
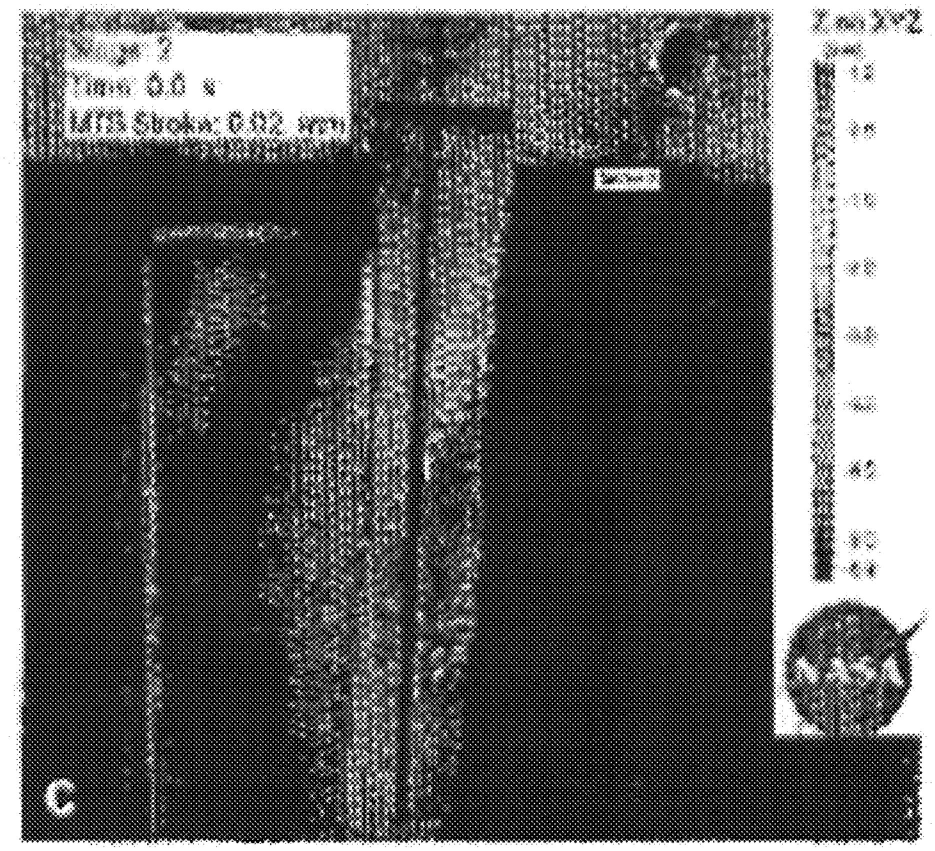
FIG. 14C is an illustration of a color-coded displacement in the y-direction (out of the plane of the figure) for a 8 wt % surface-modified $MnFe_2O_4$ film in the magnetic field in accordance with an aspect of the innovation.

The magnetic field was induced by a static magnet with a magnetic field of $B_y$ (y=0)=430 mT corresponding to the onset of saturation magnetization for the nanoparticles. FIGS. 14A and 14B illustrate a schematic 1400A, 1400B of the film position with respect to the magneto-static field. The test begins with the film positioned 50 mm from the magnet. The film is then moved toward the magnet at a rate of 0.5 mm/s using the test frame. Once the film is in close proximity of the magnet, the magnetic field causes the film to move gradually in the y direction. This deflection is measured using the optical displacement equipment and is given as displacement, $\delta_y$, for various points along the length of the film. FIG. 14C illustrates the color-coded displacement 1400C in the y-direction (out of the plane of the figure) for the 8 wt % surface-modified $MnFe_2O_4$ film in the magnetic field.

Upon approaching the magnet, the film moves gradually in the y-direction where one end is fixed. However, the film eventually reaches a point where the magnetic force applied on the film is equal to the weight and the force required for the maximum deformation resulting in complete pulling of the film to the magnet. The separation distance at this point was the maximum displacement, $\delta_{ymax}$.

Figure 15A:
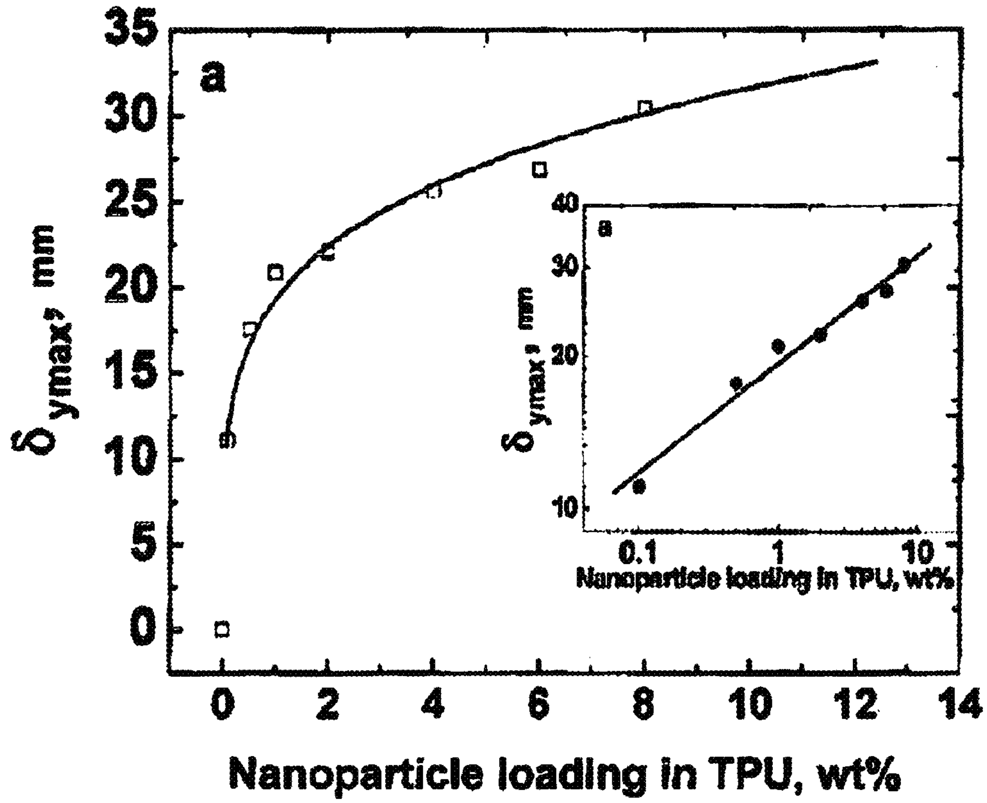
FIG. 15A is a graph depicting the maximum displacement, $\delta_{ymax}$, versus loading of the magnetic nanoparticles in accordance with an aspect of the innovation.

FIG. 15A is a graph 1500A depicting the maximum displacement, $\delta_{max}$, versus loading of the magnetic nanoparticles. The maximum displacement exhibits an exponential decay with the following fitting parameters:

$$\delta_{ymax} = A\omega^B \quad (9)$$

where A=19.28±0.01, B=0.21±0.015 with $r^2$=0.99.

Combining Equation (9) with Equation (1), an empirical equation correlating the maximum displacement, $\delta_{ymax}$, to the film saturation magnetization, $M_s$, and magnetic nanoparticle weight percent can be proposed:

$$\delta_{ymax} = 0.5M_s\omega^{0.81} \quad (10)$$

This correlation suggests that the maximum displacement has a stronger dependence on the saturation magnetization than on the weight percent of the magnetic nanoparticles.

The maximum displacement increased significantly with increasing magnetic nanoparticle concentration particularly at low particle loadings and up to 2 wt %, see FIG. 15A. As expected, the nanocomposites containing more than 2 wt % reached their maximum deformation at even greater distances. For example, the maximum displacement for the 0.1 wt % (0.025 vol. %) nanocomposite is 11.1 mm whereas the maximum displacement for the 8 wt % (2.13 vol. %) nanocomposite is 30.42 mm. It is evident that surface-modified $MnFe_2O_4$/TPU nanocomposites exhibit large displacements even with a low particle load of 0.1 wt % (0.025 vol. %).

Figure 15B:
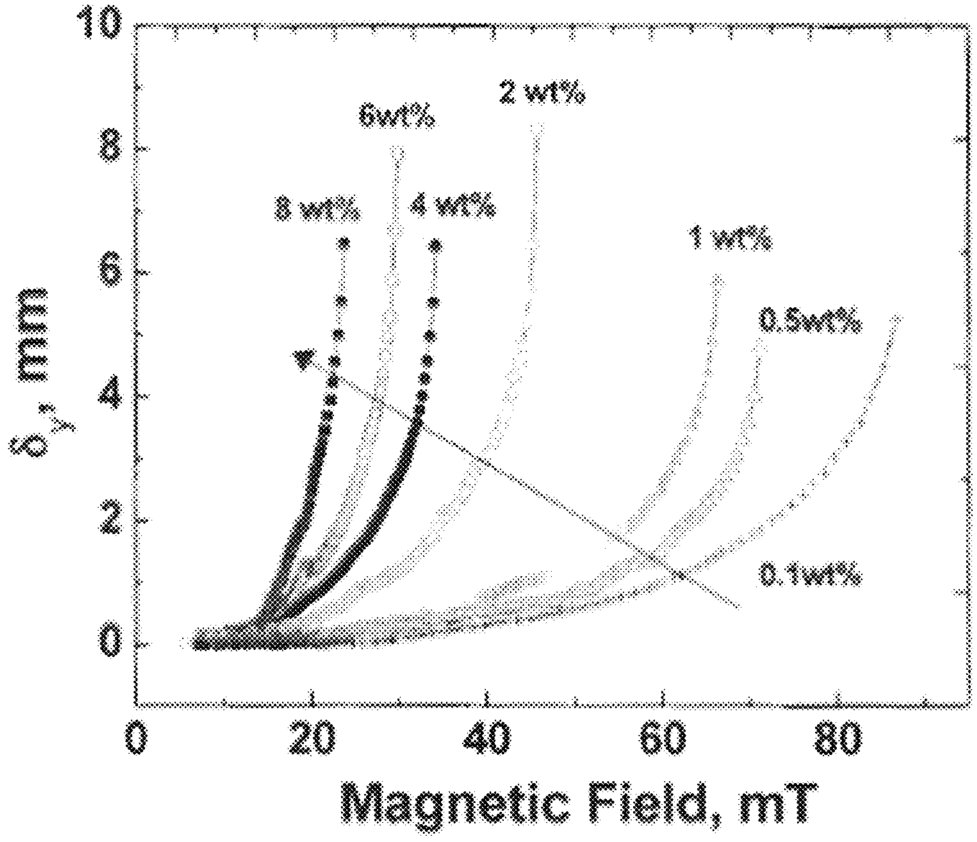
FIG. 15B is a graph illustrating the displacement of the surface modified $MnFe_2O_4$/TPU nanocomposites versus the applied magnetic field in accordance with an aspect of the innovation.

FIG. 15B is a graph 1500B illustrating the displacement of the surface modified $MnFe_2O_4$/TPU nanocomposites versus the applied magnetic field. The displacement rate is lower for films containing low particle loads, and increases as the particle loading increases.

Because accurate control over actuation is critical to actuator performance, the recovery and response time of the films were examined. Cyclic deformation of the nanocomposite film containing 6 wt % $MnFe_2O_4$ nanoparticle loading was performed five times in a low magnetic field of 15.1 (mT)$\leq$B (y)$\leq$30.3 (mT).

Figure 16A:
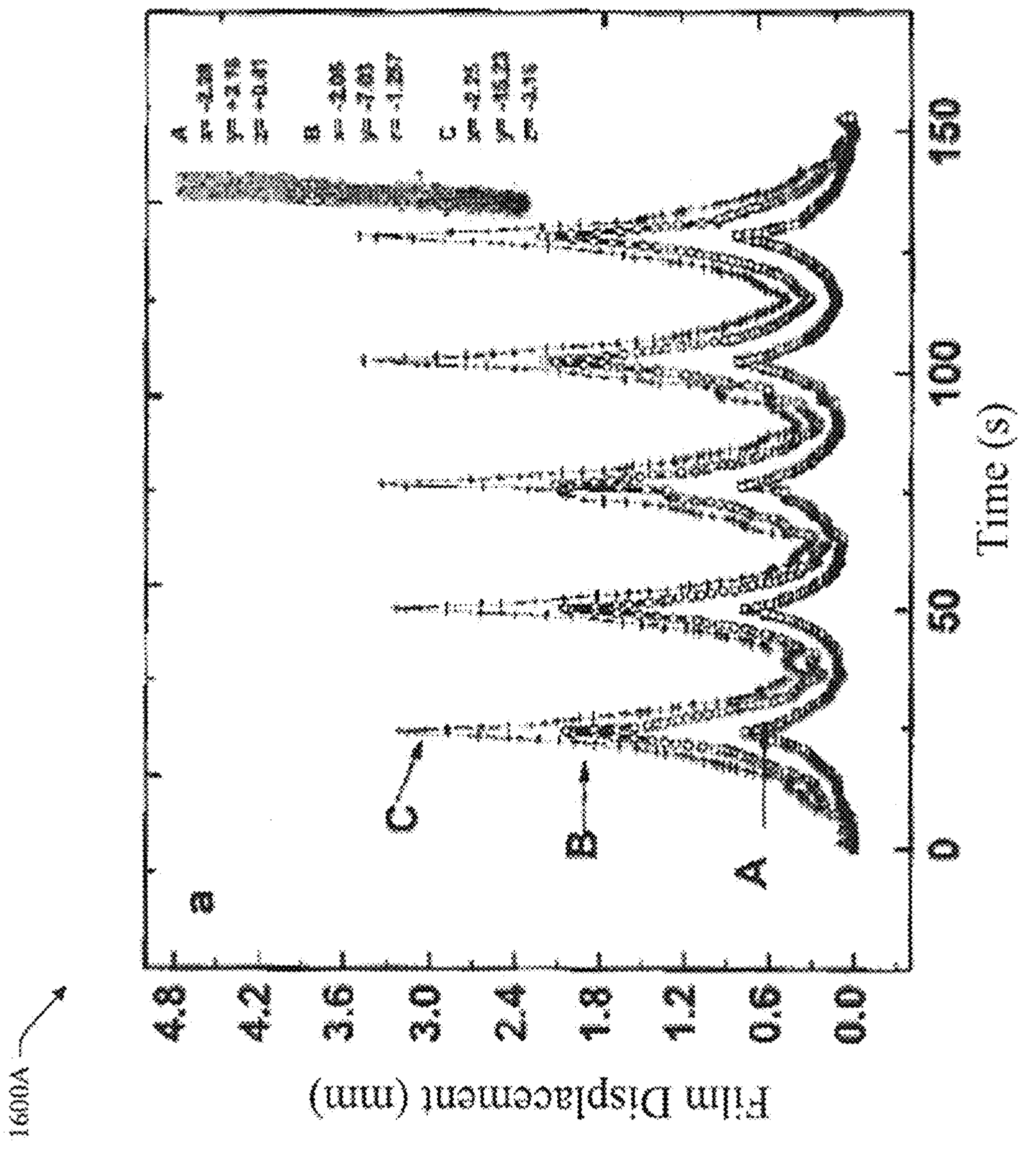
FIG. 16A is a graph illustrating a film displacement versus time while cycling in the magnetic field in accordance with an aspect of the innovation

FIG. 16A is a graph 1600A illustrating the film displacement versus time while cycling in the magnetic field. The imposed cyclic period time was 25 seconds with the film having an approximate 3 second lag time. The maximum displacement of the films from cycle-to-cycle was constant and reproducible within the experimental conditions. The films also returned to their original position as the cycle returned to the low value of the magnetic field.

Figure 16B:
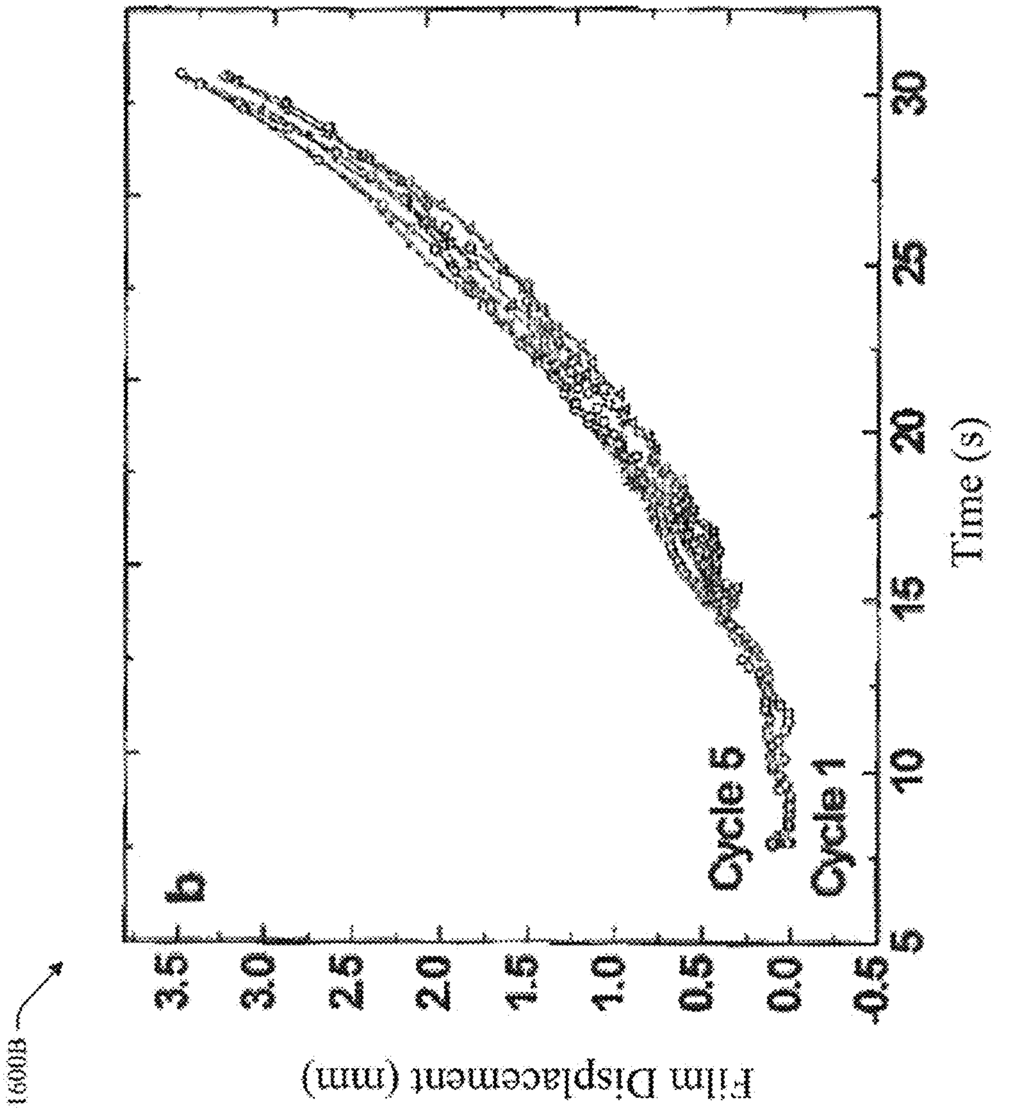
FIG. 16B is a graph illustrating a film displacement in accordance with an aspect of the innovation.

To determine the loss and hysteresis of the 6 wt % nanocomposite film in the magnetic field (15.1 mT<B(y)<30.3 mT) the film displacement 1600B is plotted in FIG. 16B for all five cycles. The traces from all five cycles were identical within experimental error. Neither hysteresis nor permanent deformation could be discerned from this test.

Figure 17:
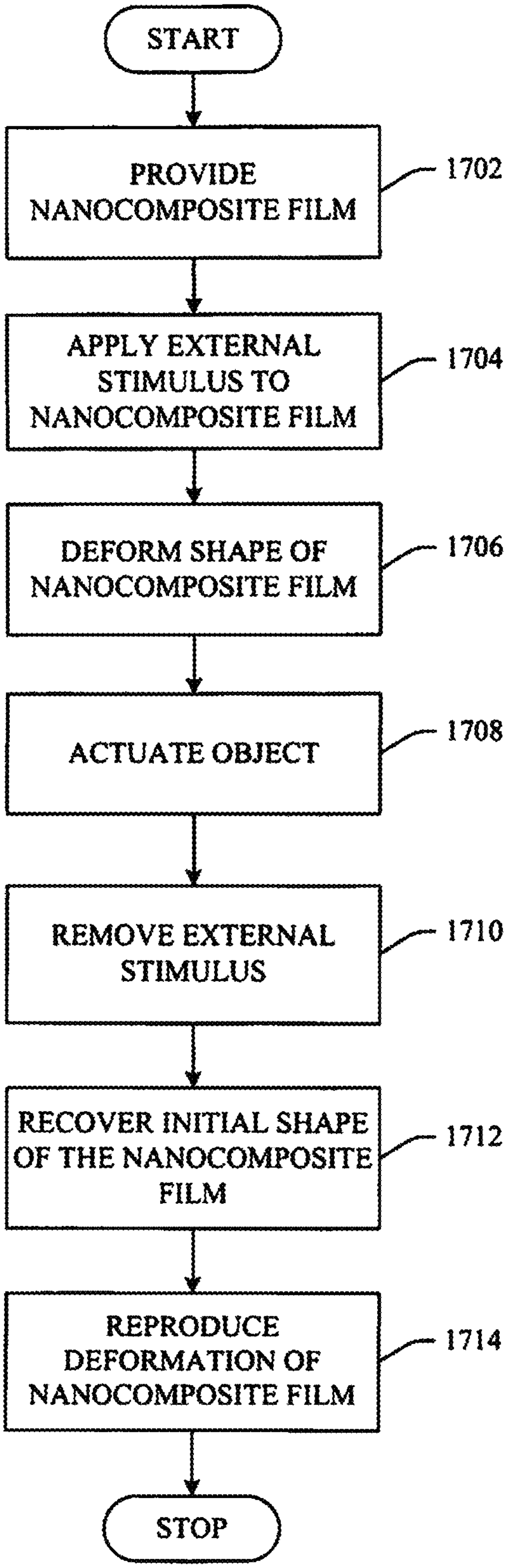
FIG. 17 illustrates an example flow chart of a procedure of actuating a large strain nanocomposite film in accordance with an aspect of the innovation.

Referring to FIG. 17, a method of actuating a large strain nanocomposite film will be described. At 1702, a thermoplastic polyurethane (TPU) polymer nanocomposite film having manganese ferrite ($MnFe_2O_4$) nanoparticles therein as disclosed herein is provided. At 1704, an external stimulus is applied to the nanocomposite film. At 1706, a shape of the nanocomposite film is deformed, and at 1708 an object is actuated, which is caused by the deformation of the nanocomposite film. At 1710, the external stimulus is removed and at 1712, the initial shape of the nanocomposite film is recovered. Finally, if necessary, at 1714, the deformation of the nanocomposite film is reproduced upon application of the external stimulus.

To summarize, surface modified $MnFe_2O_4$/TPU nanocomposite films with nanoparticle loading between 0.1 and 8 wt % were prepared by solution mixing followed by solvent casting. All of the films exhibited superparamagnetic behavior and the saturation magnetization increased with increasing nanoparticle content. Nanocomposite films were transparent or semi-transparent when the surface modified $MnFe_2O_4$ nanoparticle loading was less than 2 wt %. Films with nanoparticle loadings of 4 wt % and higher were opaque. Large displacements (>10 mm) of all magnetic nanocomposite films were observed when a static magnetic field was applied. The maximum displacement increased with increasing magnetic nanoparticle content. The proposed empirical correlation between the maximum displacement, saturation magnetization, and magnetic nanoparticle loading suggests a linear dependence of the maximum displacement to the saturation magnetization and a correlation to the nanoparticle weight percentage. TEM and SEM micrographs show variable dispersion ranging from small nanometer-sized clusters to more abundant micron-sized aggregates.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A method of producing superparamagnetic $MnFe_2O_4$ nanoparticles comprising:

mixing iron (III) acetylactonate, manganese acetyl acetonate, dodecanoic acid, 1, 2 dodecanediol, dodecylamine, benzyl ether under a nitrogen blanket for a first amount of time;

increasing the mixture temperature to approximately 150° C. for a second amount of time;

increasing the mixture temperature to approximately 300° C. for a third amount of time;

precipitating the nanoparticles in methanol; and centrifuging and washing nanoparticles with excess methanol.

2. The method of claim 1, wherein the nanoparticles are used to create a nanocomposite film for use as an actuator that deforms upon exposure to a magnetic field.

3. The method of claim 2, wherein the first amount of time is approximately 15 minutes.

4. The method of claim 2, wherein the second amount of time is approximately 30 minutes and the third amount of time is approximately 30 minutes.

5. The method of claim 1 further comprising:

dispersing the mixture of nanoparticles in tetrahydrofuran (THF);

sonicating the mixture of nanoparticles for a fourth amount of time;

dissolving the dispersion in THF;

mixing the dispersions with a surface-modified manganese ferrite suspension $MnFe_2O_4$;

generating an aggregate free dispersion;

sonicating the dispersions for a fifth amount of time;

solvent casting the dispersion to generate a nanocomposite film;

drying the nanocomposite films for a sixth amount of time.

6. The method of claim 5, wherein the fourth amount of time is approximately 5 minutes.

7. The method of claim 5, wherein the fifth amount of time is approximately 30 minutes.

8. The method of claim 5, wherein the nanocomposite films s approximately 0.1-8 wt % superparamagnetic nanoparticles.

9. The method of claim 5, wherein the nanocomposite film is approximately 75-100 microns thick.

10. The method of claim 1, further comprising redispersing and reprecipitating the superparamagnetic $MnFe_2O_4$ nanoparticles and recentrifuging and rewashing the superparamagnetic $MnFe_2O_4$ nanoparticles to purify the nanoparticles and remove excess reactants.

11. The method of claim 10, wherein the produced superparamagnetic $MnFe_2O_4$ nanoparticles are further mixed with a polymer to produce a magnetic polymer nanocomposite.

12. The method of claim 11, wherein the polymer is a thermoplastic polyurethane (TPU).

13. The method of claim 11, wherein the polymer is a polyimide resin.

* * * * *